United States Patent [19]

Jartyn et al.

[11] Patent Number: 5,297,478

[45] Date of Patent: Mar. 29, 1994

[54] METHOD OF OPERATING A PRESS

[75] Inventors: Hermann Jartyn, Burghaslach; Dieter Pachtner, Nuremberg, both of Fed. Rep. of Germany

[73] Assignee: Siemens Aktiengesellschaft, Munich, Fed. Rep. of Germany

[21] Appl. No.: 707,634

[22] Filed: May 30, 1991

[30] Foreign Application Priority Data

May 31, 1990 [DE] Fed. Rep. of Germany ....... 4017598

[51] Int. Cl.⁵ .................. B30B 13/00; B30B 15/26
[52] U.S. Cl. .................................. 100/35; 72/19; 100/43; 100/257
[58] Field of Search .............. 72/19, 20, 21; 100/35, 100/48, 99, 43, 50, 257, 282

[56] References Cited

U.S. PATENT DOCUMENTS

| 3,819,774 | 6/1974 | Eggenberger | 100/43 |
| 4,429,627 | 2/1984 | Edsö | 100/43 |
| 4,480,538 | 11/1984 | Yoshida | 100/43 |
| 4,743,900 | 5/1988 | Roehrle | 340/870 |
| 4,962,654 | 10/1990 | Zbornik | 72/19 |

FOREIGN PATENT DOCUMENTS

| 0047599 | 3/1983 | Japan | 100/35 |
| 0093600 | 6/1983 | Japan | 100/43 |
| 0179600 | 10/1983 | Japan | 100/43 |
| 0257998 | 12/1985 | Japan | 100/43 |
| 0180400 | 7/1988 | Japan | 100/43 |
| 0299797 | 12/1989 | Japan | 100/43 |

Primary Examiner—Stephen F. Gerrity
Assistant Examiner—Randall E. Chin
Attorney, Agent, or Firm—Kenyon & Kenyon

[57] ABSTRACT

A method of operating a press designed to eliminate fluctuations of the pressing force in a press. The maximum actual value of the stroke's pressing force is averaged over n strokes. The average value is compared with a desired value, and when there is a deviation, a position adjustment in the press is triggered by means of a controller. An example of the press position adjustment is a displacement of the axis of the slide.

5 Claims, 1 Drawing Sheet

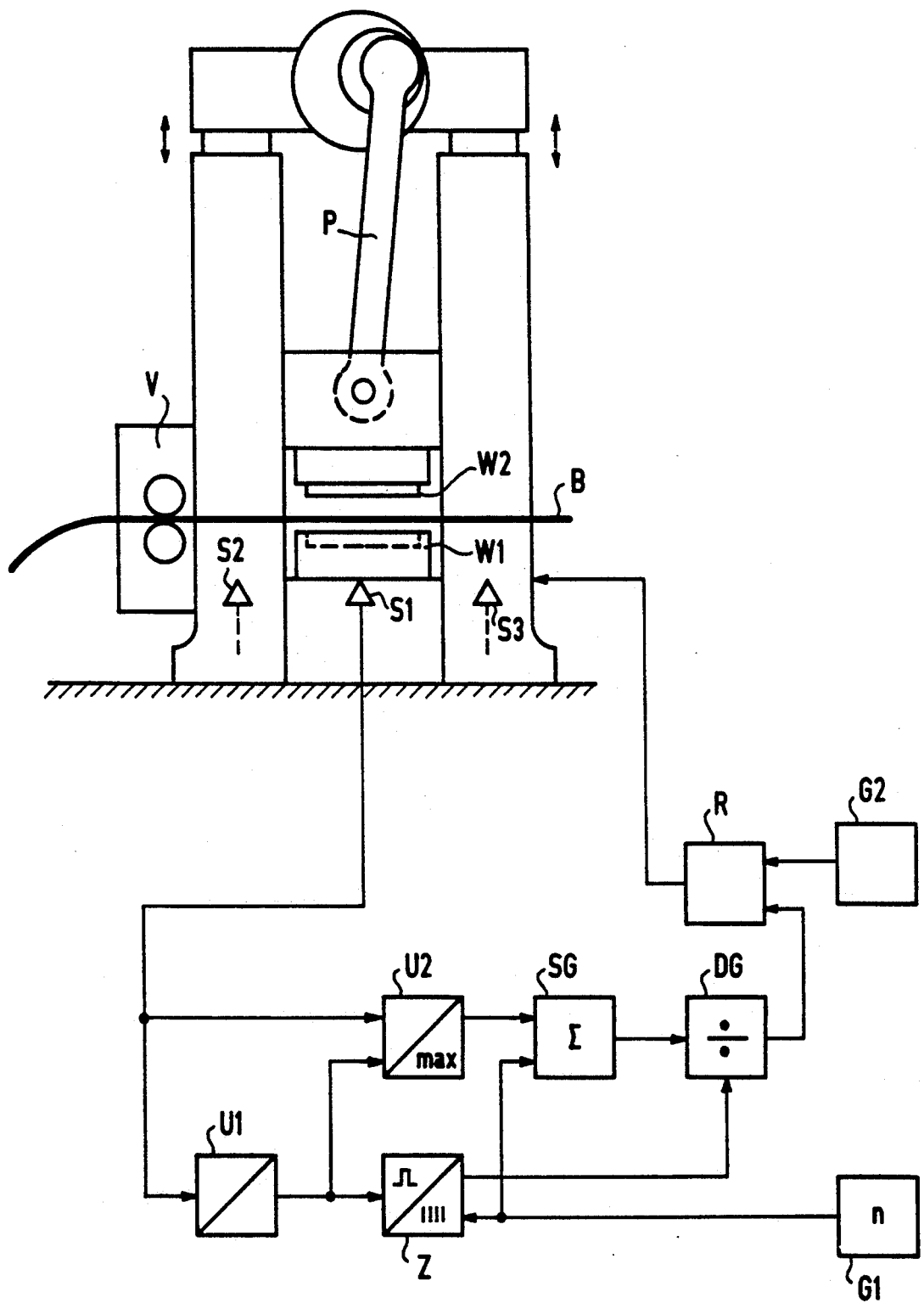

METHOD OF OPERATING A PRESS

BACKGROUND OF THE INVENTION

The invention relates generally to a method of operating a press and, more particularly to a method of operating a press wherein a continuously alternating motion of a first die relative to a second die occurs between a first and a second dead center, and wherein means are provided for detecting the pressing force.

Such methods of operating presses are commonly employed with commercial presses. For example, the tripping of a working stroke which occurs either by means of conventional mechanical cam controllers or with the aid of electronic cam controllers is disclosed in German published patent application 35 28 922.

It has been found that with longer production cycles the pressing force fluctuates. These fluctuations may result from either wear on the press such as gradual wear of the dies, or because of differently rolled metal sheets. An operator ascertains that the pressing force is off, that is, becoming too small based on the shape of the pressed parts. Prior to the present invention, it has been the practice to correct the the pressing force was corrected by varying the position of the die. However, observing the work flow does not yield more than a rough estimate of the magnitude of the change in the pressing force. Thus, making repeated adjustments of the position of the die may be necessary to optimize the quality of the workpiece. These repeated adjustments have resulted in a certain expected percentage of rejects.

The present invention is directed to modifying a convention method to maintain an optimum constancy of the pressing force during operation.

SUMMARY OF THE INVENTION

The present invention provides means for controlling the lower dead-center position based on the difference between the actual observed force and the force desired for a given workpiece. This means does so by first averaging the peak value of the pressing force over n strokes and comparing this averaged actual force with a workpiece-specific desired force. The lower dead-center position is then controlled based by means of a controller on the difference between the actual force and the desired force. This control may be performed so that the lower dead-center position is shifted with the same stroke. Alternatively, the lower dead-center position may be controlled by variation of the stroke. However, a displacement of the position of the lower die is also possible.

The present invention recognizes of the fact that detection of the peak value of the pressing force averaged over several strokes is advantageous for appropriate control of the operation of the press. Using an average force value ensures that occasional short-time anomalous measurements caused by inhomogeneities in the sheet metal will not exert a disproportionate influence on the operation of the press.

One aspect of the present invention is that when n strokes have not yet been executed, the average actual force is determined from the k strokes that have been executed at that point. Thus, position control is feasible even during the startup of the press. The value of k is advantageously greater than 1.

When the steady-state position of the press is monitored for its conformation within specified limiting values, the operating behavior of the press can be continuously observed, thus allowing one to observe the gradual wear of the dies to be observed. The ability to make such an observation is an important aspect of the present invention because then the press may be adjusted to compensate for the gradual wear of the dies. If it then appears likely that correction to the desired force by the press will not be possible much longer, appropriate action, such as replacement of the die, may be then be taken by maintenance personnel.

Providing means for specifying the value of n in the present invention allows the time window within which the actual forces are averaged to be readily varied.

BRIEF DESCRIPTION OF THE DRAWING

FIG. 1 is a schematic representation of a press constructed according to the principles of the present invention.

DETAILED DESCRIPTION

FIG. 1 illustrates a mechanical press in which two dies, W1 and W2, are cyclically pressed against each other to form appropriate workpieces from a metal sheet B. Metal sheet B is fed through a feeding means V which advances the sheet B whenever the dies W1 and W2 are not engaged in contact. While the lower die W1 is stationary, die W2 is alternately moved up and down by means of an eccentrically mounted connecting rod P. If adapting the press to different machine operations is desirable, the height of the columns of the press can be adjusted as indicated by double arrows. This adjustment results in the upper dead center and the lower dead center of the die W2 being likewise displaced, the location of the dead center being critical in pressing operations. shifting the bearing of the connecting rod P so that with respect to its eccentricity, the amplitude of the stroke motion is varied is also possible. This variation provides another means of controlling the lower dead center of die W2.

A sensor S1, indicated in FIG. 1 by a triangle, is disposed near die W1. Sensor S1 determines the instantaneous pressing force of die W2 relative to die W1 by measuring the pressure of the pressing operation. A workpiece-specific relationship between pressure and pressing force exists. The measures described below may, of course, be applied to the pressing pressure as well as the pressing force.

Another embodiment of the present invention includes two sensors S2 and S3 for detecting the press force instead of a single sensor S1. The sensors S2 and S3 are preferably disposed in the columns of the press so what their summated signals provide information on the resulting pressing force. While the use of either one or two sensors is left to the discretion of the user, for optimum detection of the press force both measuring techniques might be used.

The output signals of sensor S1 are routed to converters U1 and U2 and, if necessary, to further indicating and processing devices not shown in FIG. 1. Whenever the pressure, as detected by the sensor S1, reaches its maximum for the stroke, the converter U1 outputs a pulse which not only causes converter U2 to retain the then current value of the pressing force as the maximum value for the stroke, but also increments a counter Z. Preferably, counter Z is reset to 0 by means of resetting means (not shown) at the beginning of a press operation. Thus, after the first working stroke of the press, the counter Z assumes the value 1, and the pressing-force value for the first pressing operation appears at the output of converter U2. This pressing-force value is then routed to a summing element SG. (The summing element SG is set to 0, its initial position, at the beginning of the operation by resetting means not shown in the FIGURE.) The contents of the summing element SG are routed to a dividing element DG. The dividing element DG divides the result obtained in the summing element SG by the count of the counter Z. The summing element SG is designed so that it can add up the n or k values until k=n last pressing-force values, as determined by the converter U2, so that the pressing force can be averaged. The value n or k until k =n is transmitted to the summing element through a transducer G1. The transducer G1 also prevents the counter from being incremented above a value n.

After a first pressing operation, the pressing-force value for that first pressing operation is in the summing element SG and the counter Z has a value of 1. Following the first pressing operation, the dividing element DG consequently routes the pressing-force value as an average pressing force value to a controller R (provided that at least k strokes, wherein k is greater than 1, have been executed so as to avoid anomalous measurements). Moreover, a transducer G2 transmits to the controller R a desired target value for the pressing force. Based on the difference between these two values, the controller R adjusts the operation of the press. For example, the adjustment may be in the form of an adjustment of the height of the columns of the press, as indicated in the FIGURE by the double arrows. Additionally, the position of the press may be indicated by visual display means not shown in the FIGURE. Its position may further be monitored by means of threshold-value modules, not shown in the FIGURE, whose responding alerts the operator to the fact that the permissible control range may momentarily or shortly be exceeded.

After two pressing operations, the sum of the first two pressing-force values would be present in the summing element SG and the counter Z is set at 2. The dividing element DG would therefore use the divisor 2 to determine the average pressing-force value. This process would be continued for all values k smaller than n. The accuracy with which the average pressing-force value is determined continuously increases.

From the instant that k equals the value n, which is specified by the transducer G1, the interval of time within which the instantaneous average pressing force is averaged is retained. The magnitude of the value n specifies a time constant for average-value generation. The value n can be set through the transducer G1 based on the type of the press and on the dynamics of the disturbances.

The functional blocks indicated in the FIGURE by squares may well be integral parts of a numerical control system.

What is claimed is:

1. A method for adjusting the lower dead center position of a first die in a press having a cyclic, continuous motion of said first die, said first die having an upper dead center position and a lower dead center position relative to a second die, wherein said motion occurs between said upper dead center and said lower dead center, wherein said motion generates a pressing force having a peak force value, and wherein said press comprises means for detecting said pressing force, and controlling means for adjusting the lower dead center position of said first die the method comprising the steps of:
   a. summing a number of peak force values corresponding to an identical number of cycles of said first die of said press;
   b. calculating an average peak force value by dividing the sum of the peak force values by the number of pressing cycles executed by the press;
   c. comparing said average peak force value to a specific desired force value; and
   d. adjusting said lower dead center position of said first die by said controlling means based on the difference between said average force and said desired force.

2. The method according to claim 1 further comprising the step of specifying a value n which shall be the identical number of cycles of said first die of said press over which the average peak force is computed.

3. The method according to claim 2 further comprising the step of calculating said average peak force by dividing the sum of the peak force values by k, wherein k is the number of strokes executed by the press, when k is less than said value n.

4. A method for adjusting the lower dead center position of a first die in a press having a cyclic, continuous motion of said first die, said first die having an upper dead center position and a lower dead center position relative to a second die, wherein said motion occurs between said upper dead center and said lower dead center, wherein said motion generates a pressing force having a peak force value, and wherein said press comprises means for detecting said pressing force, the method comprising the steps of:
   a. summing a number of peak force values corresponding to an identical number of cycles of said first die of said press;
   b. calculating an average peak force value by dividing the sum of the peak force values by the number of pressing cycles executed by the press;
   c. comparing said average peak force value to a specific desired force value; and
   d. monitoring the difference between said average force and said desired force; and
   e. adjusting the lower dead center position based upon said monitored difference between said average force and said desired force.

5. A method for adjusting the lower dead center position of a first die in a press having a cyclic, continuous motion of said first die, said first die having an upper dead center position and a lower dead center position relative to a second die, wherein said motion occurs between said upper dead center and said lower dead center, wherein said motion generates a pressing force having a peak force value, and wherein said press comprises means for detecting said pressing force, the method comprising the steps of:
   a. summing a number of peak force values corresponding to an identical number of cycles of said first die of said press;
   b. calculating an average peak force value by dividing the sum of the peak force values by the number of pressing cycles executed by the press;
   c. monitoring said average force; and
   d. adjusting said lower dead center position based upon said monitored average force.

* * * * *